(12) United States Patent  
Berlin et al.

(10) Patent No.: US 10,200,124 B2  
(45) Date of Patent: *Feb. 5, 2019

(54) UNIFIED OPTICAL FIBER-BASED DISTRIBUTED ANTENNA SYSTEMS (DASS) FOR SUPPORTING SMALL CELL COMMUNICATIONS DEPLOYMENT FROM MULTIPLE SMALL CELL SERVICE PROVIDERS, AND RELATED DEVICES AND METHODS

(71) Applicant: Corning Optical Communications Wireless Ltd, Airport City (IL)

(72) Inventors: Igor Berlin, Potomac, MD (US); William Patrick Cune, Charlotte, NC (US)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,626

(22) Filed: Oct. 23, 2017

(65) Prior Publication Data  
US 2018/0062745 A1 Mar. 1, 2018

Related U.S. Application Data

(63) Continuation of application No. 15/134,473, filed on Apr. 21, 2016, now Pat. No. 9,800,340, which is a (Continued)

(51) Int. Cl.  
*H04B 10/25* (2013.01)  
*H04B 10/2575* (2013.01)  
(Continued)

(52) U.S. Cl.  
CPC ... *H04B 10/25753* (2013.01); *H04B 10/2575* (2013.01); *H04W 16/18* (2013.01); *H04W 88/085* (2013.01)

(58) Field of Classification Search  
CPC ............... H04B 10/2575; H04B 10/25753  
See application file for complete search history.

(56) References Cited

U.S. PATENT DOCUMENTS

| 5,206,655 A | 4/1993 | Caille et al. |
| 5,682,256 A | 10/1997 | Motley et al. |

(Continued)

FOREIGN PATENT DOCUMENTS

| EP | 1347584 A2 | 9/2003 |
| EP | 1954019 A1 | 8/2008 |

(Continued)

OTHER PUBLICATIONS

International Search Report and Written Opinion of the International Searching Authority, PCT/IL2014/050907; dated Feb. 9, 2015: 16 Pages: European Patent Office.

(Continued)

*Primary Examiner* — Dzung Tran  
(74) *Attorney, Agent, or Firm* — C. Keith Montgomery

(57) ABSTRACT

Unified optical fiber-based distributed antenna systems (DASs) for supporting small cell communications deployment from multiple small cell service providers are disclosed. The unified optical fiber-based DASs disclosed herein are configured to receive multiple small cell communications from different small cell service providers to be deployed over optical fiber to small cells in the DAS. In this manner, the same DAS architecture can be employed to distribute different small cell communications from different small cell service providers to small cells. Use of optical fiber for delivering small cell communications can reduce the risk of having to deploy new cabling if bandwidth needs for future small cell communication services exceeds conductive wiring capabilities. Optical fiber cabling can also allow for higher distance cable runs to the small cells due to (Continued)

the lower loss of optical fiber, which can provide for enhanced centralization services.

24 Claims, 12 Drawing Sheets

Related U.S. Application Data continuation of application No. PCT/IL2014/050907, filed on Oct. 20, 2014.

(60) Provisional application No. 61/896,341, filed on Oct. 28, 2013.

(51) Int. Cl.
*H04W 88/08* (2009.01)
*H04W 16/18* (2009.01)

(56) References Cited

U.S. PATENT DOCUMENTS

| | | |
|---|---|---|
| 5,726,984 A | 3/1998 | Kubler et al. |
| 5,790,536 A | 8/1998 | Mahany et al. |
| 5,870,441 A | 2/1999 | Cotton et al. |
| 6,222,503 B1 | 4/2001 | Gietema et al. |
| 6,317,599 B1 | 11/2001 | Rappaport et al. |
| 6,330,244 B1 | 12/2001 | Swartz et al. |
| 6,389,010 B1 | 5/2002 | Kubler et al. |
| 6,452,915 B1 | 9/2002 | Jorgensen |
| 6,580,402 B2 | 6/2003 | Navarro et al. |
| 6,615,074 B2 | 9/2003 | Mickle et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,763,226 B1 | 7/2004 | McZeal, Jr. |
| 6,842,433 B2 | 1/2005 | West et al. |
| 6,850,510 B2 | 2/2005 | Kubler et al. |
| 6,876,056 B2 | 4/2005 | Tilmans et al. |
| 6,919,858 B2 | 7/2005 | Rofougaran |
| 6,961,312 B2 | 11/2005 | Kubler et al. |
| 7,015,826 B1 | 3/2006 | Chan et al. |
| 7,024,166 B2 | 4/2006 | Wallace et al. |
| 7,050,017 B2 | 5/2006 | King et al. |
| 7,053,838 B2 | 5/2006 | Judd |
| 7,142,535 B2 | 11/2006 | Kubler et al. |
| 7,199,443 B2 | 4/2007 | Elsharawy |
| 7,315,735 B2 | 1/2008 | Graham |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,412,224 B2 | 8/2008 | Kotola et al. |
| 7,451,365 B2 | 11/2008 | Wang et al. |
| 7,460,507 B2 | 12/2008 | Kubler et al. |
| 7,542,452 B2 | 6/2009 | Penumetsa |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,599,420 B2 | 10/2009 | Forenza et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pemu et al. |
| 7,668,565 B2 | 2/2010 | Ylanen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,809,012 B2 | 10/2010 | Ruuska et al. |
| 7,817,969 B2 | 10/2010 | Castaneda et al. |
| 7,835,328 B2 | 11/2010 | Stephens et al. |
| 7,840,190 B2 | 11/2010 | Saban et al. |
| 7,848,316 B2 | 12/2010 | Kubler et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,920,553 B2 | 4/2011 | Kubler et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 9,800,340 B2 * | 10/2017 | Berlin .............. H04B 10/25753 |
| 2002/0123365 A1 | 9/2002 | Thorson et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0165573 A1 | 8/2004 | Kubler et al. |
| 2005/0104666 A1 | 5/2005 | Rebel |
| 2005/0123085 A1 | 6/2005 | Skog et al. |
| 2005/0147071 A1 | 7/2005 | Karaoguz et al. |
| 2006/0274704 A1 | 12/2006 | Desai et al. |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0224954 A1 | 9/2007 | Gopi |
| 2007/0297005 A1 | 12/2007 | Montierth et al. |
| 2008/0043714 A1 | 2/2008 | Pemu |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0207253 A1 | 8/2008 | Jaakkola et al. |
| 2008/0253351 A1 | 10/2008 | Pemu et al. |
| 2008/0261656 A1 | 10/2008 | Bella et al. |
| 2008/0268833 A1 | 10/2008 | Huang et al. |
| 2008/0279137 A1 | 11/2008 | Pemu et al. |
| 2008/0280569 A1 | 11/2008 | Hazani et al. |
| 2008/0291830 A1 | 11/2008 | Pemu et al. |
| 2008/0292322 A1 | 11/2008 | Daghighian et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0029663 A1 | 1/2009 | Saban et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0149221 A1 | 6/2009 | Liu et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |

(56) References Cited

U.S. PATENT DOCUMENTS

| | | |
|---|---|---|
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0188998 A1 | 7/2010 | Pemu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1* | 11/2010 | Kummetz ........... H04W 88/085 398/41 |
| 2010/0290355 A1 | 11/2010 | Roy et al. |
| 2010/0309049 A1 | 12/2010 | Reunamaki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pemu |
| 2011/0021224 A1 | 1/2011 | Koskinen et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0281536 A1 | 11/2011 | Lee et al. |
| 2013/0003658 A1 | 1/2013 | Stewart et al. |
| 2014/0031049 A1* | 1/2014 | Sundaresan ........... H04W 16/02 455/447 |
| 2014/0079112 A1* | 3/2014 | Ranson ................. H04B 7/022 375/240 |

FOREIGN PATENT DOCUMENTS

| | | |
|---|---|---|
| WO | 9603823 A1 | 2/1996 |
| WO | 03024027 A1 | 3/2003 |
| WO | 2010090999 A1 | 8/2010 |
| WO | 2012148940 A1 | 11/2012 |

OTHER PUBLICATIONS

Non-Final Office Action for U.S. Appl. No. 11/828,363, dated Mar. 1, 2010, 8 pages.

International Preliminary Report on Patentability for PCT/IL2014/050907, dated May 12, 2016, 13 pages.

Author Unknown, "Fiber Optic Distributed Antenna System," Installation and Users Guide, ERAU Version 1.5, May 2002, Andrews Corporation, 53 pages.

Non-Final Office Action for U.S. Appl. No. 15/134,473, dated Jun. 1, 2017, 9 pages.

\* cited by examiner

UNIFIED OPTICAL FIBER-BASED DISTRIBUTED ANTENNA SYSTEMS (DASS) FOR SUPPORTING SMALL CELL COMMUNICATIONS DEPLOYMENT FROM MULTIPLE SMALL CELL SERVICE PROVIDERS, AND RELATED DEVICES AND METHODS

CROSS-REFERENCE TO RELATED APPLICATIONS

This application is a continuation of U.S. application Ser. No. 15/134,473 filed on Apr. 21, 2016, which is a continuation of International Application No. PCT/IL14/050907 filed on Oct. 20, 2014 which claims the benefit of priority to U.S. Provisional Application No. 61/896,341, filed on Oct. 28, 2013, all applications being incorporated herein by reference in their entireties.

BACKGROUND

The technology of the present disclosure relates generally to distributed antenna systems (DASs) for distributing communications to remote areas each forming a coverage area, and more particularly to optical fiber-based DASs configured to distribute small cell communications from multiple small cell service providers.

A cellular communications system can be provided that includes cellular base stations configured to communicate with cellular client devices to provide cellular communications services. These cellular base stations are typically co-located with cellular antennas configured to distribute transmitted wireless cellular communications signals from a cellular base station to cellular client devices residing within the wireless range of a cellular antenna. The cellular antennas are also configured to receive transmitted wireless cellular communications signals from cellular client devices to the cellular base station for transmission over a cellular network.

It may be desired to distribute cellular communications services remotely, such as in a building or other facility, to provide clients access to such cellular communications services within the building or facility. One approach to distributing cellular communications services in a building or facility involves use of radio frequency (RF) antenna coverage areas, also referred to as "antenna coverage areas." The antenna coverage areas can have a radius in the range from a few meters up to twenty meters, as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users.

As an example, FIG. 1 illustrates distribution of cellular communications services to remote coverage areas 10 of a DAS 12. In this regard, the remote coverage areas 10 are created by and centered on remote antenna units 14 connected to a head-end equipment 16 (e.g., a head-end controller or head-end unit). The head-end equipment 16 is communicatively coupled to a cellular base station (not shown). The remote antenna units 14 receive cellular communications services from the head-end equipment 16 over a communications medium 18 to be distributed in their coverage area 10. Each remote antenna unit 14 may also include an RF transmitter/receiver and an antenna 20 operably connected to the RF transmitter/receiver to wirelessly distribute the cellular communication services to cellular client devices 22 within the coverage area 10. The size of a given coverage area 10 is determined by the amount of RF power transmitted by the remote antenna unit 14, the receiver sensitivity, antenna gain and the RF environment, as well as by the RF transmitter/receiver sensitivity of the cellular client device 22. Cellular client devices 22 usually have a fixed RF receiver sensitivity, so that the above-mentioned properties of the remote antenna unit 14 mainly determine the size of the remote coverage areas 10.

With ever-increasing demands for high-speed data communication services, it may also be desired to distribute small cell communications within the same building or other facility in which the DAS 12 is deployed. Small cell communications units have a digital backhaul. Small cells may include cellular service small cells, Wireless Fidelity (WiFi) Access Points, 60 GHz radio devices, digital DAS and remote radio heads (RRHs), location radio nodes, wireless readers, and radio nodes for specific applications, like Wireless Medical Telemetry System (WMTS) for example. Fifteen (15) to forty (40) small cells may be required to be deployed in the building for each small cell service. Thus, a building may be first served by a cellular distributed antenna system, like the DAS 12 in FIG. 1, for example. Other equipment and small cells may then be deployed in the building to support other small cell communications services. However, the capacity of the building to support the additional equipment and small cells may be limited.

SUMMARY

Embodiments disclosed herein include unified optical fiber-based distributed antenna systems (DASs) for supporting small cell communications deployment from multiple small cell service providers. Related devices and methods are also disclosed. A small cell is a small size radio node with a digital backhaul. Non-limiting examples include cellular service small cells, Wireless Fidelity (WiFi) access points, extremely high frequency (EFH) radio devices (e.g., 30+ GHz), digital DAS and remote radio heads (RRHs), location radio nodes, wireless readers, and other radio nodes for specific applications. The unified optical fiber-based DASs disclosed herein are configured to receive multiple small cell communications from different small cell service providers to be deployed over optical fiber to small cells in the DAS. In this manner, the same DAS architecture can be employed to distribute different small cell communications from different small cell service providers to a plurality of small cells. Use of optical fiber for delivering small cell communications to the small cells can reduce the risk of having to deploy new cabling if bandwidth needs for future small cell communication services exceeds conductive wiring capabilities. Optical fiber cabling can also allow for higher distance cable runs to the small cells due to the lower loss of optical fiber, which can provide for enhanced centralization of the small cell communications interfaces in the DAS for ease in installations and reconfigurations of small cell service providers and centralized monitoring of small cell communications. The unified optical fiber-based DAS may also be configured to support other communications, including but not limited to communications that are distributed through analog DAS equipment.

In this regard, certain embodiments of the disclosure relate to a unified optical fiber-based DAS that includes a communications control equipment as a central receiving point to receive different small cell communications from different small cell communications service providers to be deployed. The communications control equipment includes a plurality of small cell communications interfaces each coupled to a dedicated small cell communications switch for each small cell communications. Each small cell communications switch is configured to receive and route the received small cell communications to small cells deployed in the DAS. The small cell communications are routed through a media converter to be converted to optical signals to be provided as optical small cell communications over dedicated optical fibers to the small cells. Each small cell being communicatively coupled to a small cell communications via a dedicated optical fiber keeps small cell communications between different small cell server providers separate to not reduce bandwidth and facilitate providing enhanced data communications security between different small cells, as non-limiting examples. A data processor is provided in the communications control equipment for each small cell communications interface. The data processors are each configured to analyze data communicated over the small cell communications interface and insert or modify the data depending on the desired application. The data processors may also be communicatively coupled to an application server to provide centralized services affecting all small cell communications, including providing small cell communications service to other networks.

In one embodiment, an optical fiber-based DAS for supporting small cell communications from different small cell service providers comprises a plurality of edge devices each configured to receive electrical communications from a network. The plurality of edge devices comprise at least one first small cell configured to receive a first electrical small cell communications, and at least one second small cell configured to receive a second electrical small cell communications different from the first electrical small cell communications. The optical fiber-based DAS also comprises a communications control equipment. The communications control equipment comprises a plurality of communications interfaces each configured to receive electrical communications. The plurality of communications interfaces comprise at least one first small cell communications interface configured to receive a first small cell communications from a first small cell service provider, and at least one second small cell communications interface configured to receive a second small cell communications from a second small cell service provider. The communications control equipment also comprises a plurality of switches. The plurality of switches comprise a plurality of communications output ports and a plurality of communications input ports, the plurality of communications input ports each configured to be coupled to a communications interface among the plurality of communications interfaces. Also, each of the plurality of switches is configured to route an electrical communications among a plurality of electrical communications received on a communications input port among the plurality of communications input ports to at least two communications output ports among the plurality of communications output ports. The optical-fiber based DAS also comprises a plurality of media converters. The plurality of media converters comprises a first media converter. The first media converter is configured to receive a first electrical communications from at least one communications output port of the plurality of switches. The first media converter is also configured to convert the received first electrical communications to a first optical communications, the first optical communications comprising a first optical small cell communications. The first media converter is also configured to route the first optical small cell communications over at least one first dedicated optical fiber among a plurality of optical fibers to the at least one first small cell. The plurality of media converters also comprises a second media converter. The second media converter is configured to receive a second electrical communications from a second communications output port of the plurality of switches. The second media converter is also configured to convert the received second electrical communications to a second optical communications comprising a second optical small cell communications, and to route the second optical small cell communications over at least one second dedicated optical fiber among a plurality of optical fibers to the at least one second small cell.

An additional embodiment relates to a method of distributing small cell communications from different small cell service providers in an optical fiber-based DAS. The method comprises receiving a plurality of electrical communications over a plurality of communications interfaces from a plurality of communications service providers, comprising receiving a first small cell communications from a first small cell service provider on at least one first small cell communications interface, and receiving a second small cell communications from a second small cell service provider on at least one second small cell communications interface, the second small cell communications different from the first small cell communications. The method also comprises providing each of the plurality of electrical communications to at least one communications port in at least one switch among a plurality of switches, each switch among the plurality of switches coupled to at least one communications interface among the plurality of communications interfaces. The method also comprises routing each of the plurality of electrical communications received on a plurality of communications input ports to at least two communications output ports among a plurality of communications output ports in the plurality of switches. The method also comprises receiving in a plurality of media converters, the plurality of electrical communications from the plurality of communications output ports of the plurality of switches. The method also comprises converting in the plurality of media converters, the received plurality of electrical communications to a plurality of optical communications, the plurality of optical communications comprising a first optical small cell communications and a second optical small cell communications. The method also comprises routing the first optical small cell communications over at least one first dedicated optical fiber among a plurality of optical fibers to at least one first small cell. The method also comprises routing the second optical small cell communications over at least one second dedicated optical fiber among the plurality of optical fibers to at least one second small cell.

Additional features and advantages will be set forth in the detailed description which follows, and in part, will be readily apparent to those skilled in the art from the description or recognized by practicing the embodiments as described in the written description and claims hereof, as well as the appended drawings.

The foregoing general description and the following detailed description are merely exemplary, and are intended to provide an overview or framework to understand the nature and character of the claims. The drawings are included to provide a further understanding and are incorporated in and constitute a part of this specification.

DETAILED DESCRIPTION

Various embodiments will be further clarified by the following examples.

Figure 1:
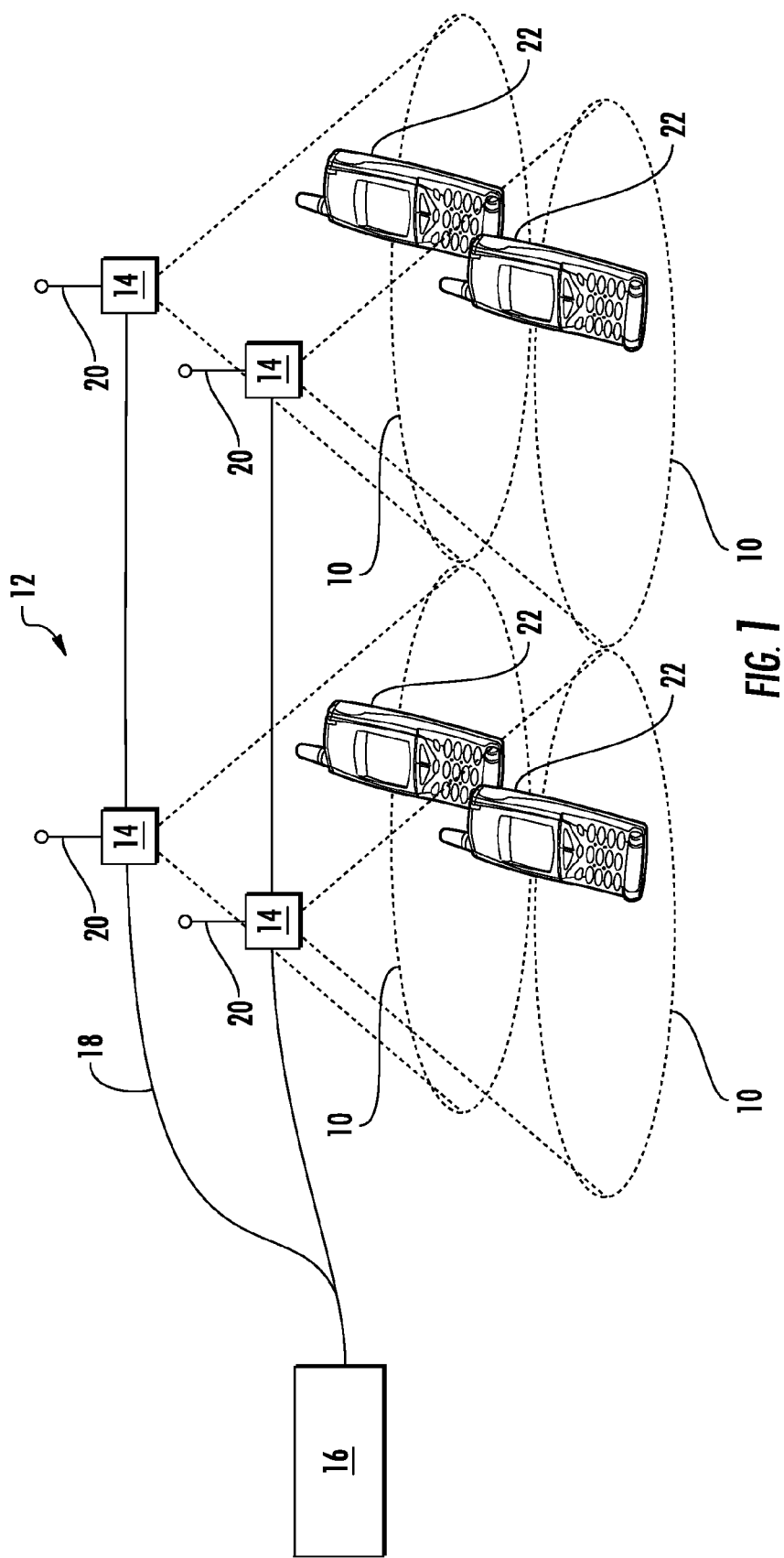
FIG. 1 is a schematic diagram of an exemplary distributed antenna system (DAS) capable of distributing wireless communications to client devices.
Figure 2:
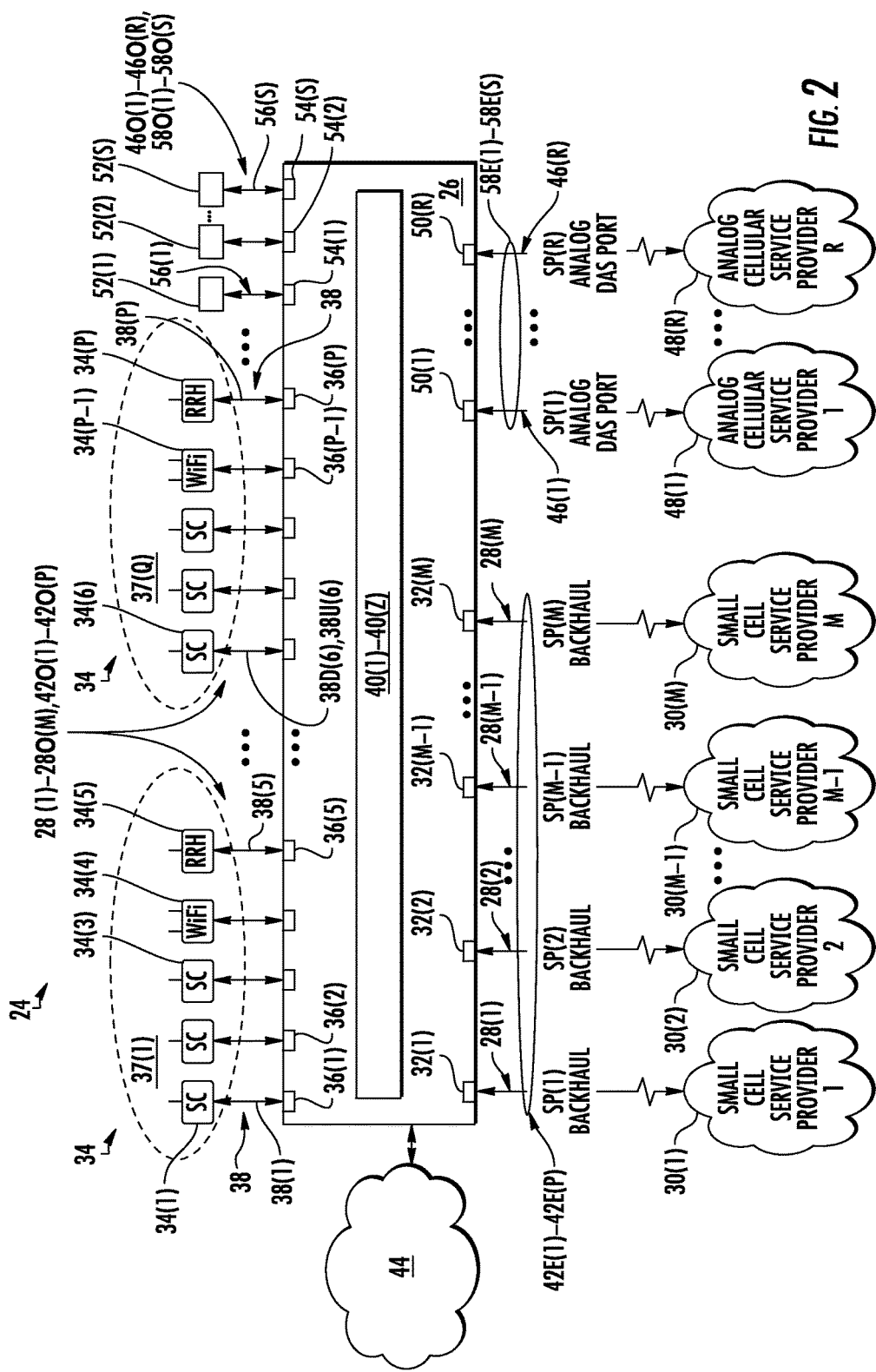
FIG. 2 is a schematic diagram of an exemplary unified optical fiber-based DAS for supporting small cell communications deployment from multiple small cell service providers over separate optical fibers.

FIG. 2 is a schematic diagram of an exemplary unified optical fiber-based DAS 24 for supporting small cell communications deployment from multiple small cell service providers over separate optical fibers. As will be discussed in more detail below, the unified optical fiber-based DAS 24 is configured to receive multiple small cell communications from different small cell service providers to be deployed over optical fiber to small cells in the DAS. In this manner, the same DAS architecture can be employed to distribute different small cell communications from different small cell service providers to a plurality of small cells. Use of optical fiber for delivering small cell communications to the small cells can reduce the risk of having to deploy new cabling if bandwidth needs for future small cell communication services exceeds conductive wiring capabilities. Optical fiber cabling can also allow for higher distance cable runs to the small cells due to the lower loss of optical fiber, which can provide for enhanced centralization of the small cell communications interfaces in the DAS for ease in installations and reconfigurations of small cell service providers and centralized monitoring of small cell communications. The unified optical fiber-based DAS 24 may also be configured to support other communications, including but not limited to communications distributed through analog DAS equipment.

In this regard, the unified optical fiber-based DAS 24 includes communications control equipment 26 configured to distribute a plurality of small cell communications 28(1)-28(M) from a plurality of small cell service providers 30(1)-30(M), where M is equal to the number of small cell service providers. A small cell communications is a communications for a small cell. A small cell is a small size radio node with a digital backhaul. Non-limiting examples of small cells include cellular service small cells, Wireless Fidelity (WiFi) access points, extremely high frequency (EFH) radio devices (e.g., 30+ GHz), digital DAS and remote radio heads (RRHs), location radio nodes, wireless readers, and other radio nodes for specific applications. All or a subset of the small cell communications 28(1)-28(M) provided to the communications control equipment 26 may include the same small cell communications or different small cell communications.

With continuing reference to FIG. 2, to facilitate receiving the plurality of small cell communications 28(1)-28(M) from the small cell service providers 30(1)-30(M), the communications control equipment 26 in the unified optical fiber-based DAS 24 includes a plurality of communications interfaces 32(1)-32(M). The communications interfaces 32(1)-32(M) are configured to receive the respective small cell communications 28(1)-28(M) from the respective small cell service providers 30(1)-30(M). The communications control equipment 26 is configured to distribute the small cell communications 28(1)-28(M) to any of a designated plurality of small cell edge devices 34(1)-34(P) (also referred to herein as "small cells 34(1)-34(P)") where P is the number of small cell edge devices. Small cells are radio units with a digital backhaul that usually include an integrated antenna. Small cells may be installed on the wall or on the ceiling serving the area in their proximity. The communications control equipment 26 also includes a plurality of communications output ports 36(1)-36(P) coupled to the plurality of small cells 34(1)-34(P). The communications control equipment 26 is configured to route the small cell communications 28(1)-28(M) through designated or configured communications output ports 36(1)-36(P) to be distributed to the small cells 34(1)-34(P). The small cells 34(1)-34(P) may be provided in remote locations in a building or other facility. Subsets of the small cells 34(1)-34(P) may also be grouped together to be provided in the same area, such as shown in FIG. 2. In FIG. 2, small cells 34(1)-34(5) are provided in a first area 37(1), and small cells 34(6)-34(P) are provided in another area 37(Q), where Q is the number of areas.

With continuing reference to FIG. 2, as an example, the communications control equipment 26 routes a received first small cell communications 28(1) from small cell service provider 30(1) to a first small cell 34(1) and a received second small cell communications 28(2) from small cell service provider 30(2) to another small cell 34(2). The first and second small cell communications 28(1), 28(2) are from different small cell service providers 30(1), 30(2) in this example. However, small cell communications 28(1), 28(2)

may be the same small cell communication services or different small cell communication services. For example, the first small cell communications 28(1) may be RRH communication services routed to the RRH small cell 34(5), while the second small cell communications 28(2) may be WiFi communication services routed to the WiFi access point 34(4). In this manner, the same communications control equipment 26 can be employed to distribute small cell communications 28 from different small cell service providers 30 to different small cells 34. For example, providing a common communications control equipment 26 can simplify overall management and access to different locations inside a building or other facility hosting the unified optical fiber-based DAS 24.

The unified optical fiber-based DAS 24 in FIG. 2 also employs the use of optical fiber 38 for delivering the small cell communications 28(1)-28(M) to the small cells 34(1)-34(P). Optical fiber 38 is used to communicatively couple the small cells 34(1)-34(P) to the communications control equipment 26 to facilitate distribution of small cell communications 28(1)-28(M) to the small cells 34(1)-34(P) and to receive return small cell communications from the small cells 34(1)-34(P) to be distributed back to the small cell service providers 30(1)-30(M). Providing optical fiber 38 for distributed communications between the communications control equipment 26 and the small cells 34(1)-34(P) can reduce the risk of having to deploy new cabling if bandwidth needs for future small cell communication services exceeds conductive wiring capabilities. The optical fiber 38 can also allow for higher distance cable runs to the small cells 34(1)-34(P) due to the lower loss of optical fiber, which can provide for enhanced centralization of the communications control equipment 26 in the unified optical fiber-based DAS 24 for ease in installations and reconfigurations of small cell service providers 30(1)-30(M) and centralized monitoring of the small cell communications 28(1)-28(M).

In this embodiment, each small cell 34(1)-34(P) in the unified optical fiber-based DAS 24 in FIG. 2 is communicatively coupled to the communications control equipment 26 through respective dedicated optical fibers 38(1)-38(P). For example, using optical fiber 38(6) as an example, two optical fibers may be employed to communicatively couple a small cell 34(6) to the communications control equipment 26—one optical fiber 38D(6) for downlink communications distributed to a small cell 34 and one optical fiber 38U(6) for uplink communications received from a small cell 34. Each small cell 34(1)-34(P) being communicatively coupled to a small cell communications 28(1)-28(M) via dedicated optical fibers 38 keeps each small cell communications 28(1)-28(M) separated from each other so that each small cell communications 28(1)-28(M) does not have to share bandwidth of an optical fiber with any other small cell communications 28(1)-28(M). Providing dedicated optical fibers 38 for each small cell 34(1)-34(P) can also facilitate enhanced data communications security between different small cell services 28(1)-28(M), in that multiple small cell communication services 28 are not carried on the same optical fibers 38. However, multiple small cell communications 28(1)-28(M) can be combined over a common optical fiber 38 through use of multiplexing and switching if desired.

Alternatively, small cell communications 28(1)-28(M) from two or more small cell service providers 30(1)-30(M) can be routed through the same optical fiber 38. However, sharing small cell communications 28(1)-28(M) over shared optical fiber also shares the available bandwidth between the small cell communications 28(1)-28(M). There may also be a requirement for the small cell service providers 30(1)-30(M) to not share optical fiber 38 for providing small cell communications 28(1)-28(M).

With continuing reference to FIG. 2, the optical fibers 38(1)-38(P) may be provided individually in cables or bundled together in sets or subsets of the optical fibers 38(1)-38(P) in a common cable to be distributed to connected respective sets or subsets of the small cells 34(1)-34(P). For example, a common optical fiber cable containing a plurality of optical fibers 38 may be employed to service small cells 34 in the same area 37.

With continuing reference to FIG. 2, the communications control equipment 26 in this embodiment includes a plurality of media converters 40(1)-40(Z) to support use of the optical fiber 38 for distribution of small cell communications 28(1)-28(M) between the communications control equipment 26 and the small cells 34(1)-34(P). Each media converter 40(1)-40(Z) may be dedicated to perform media conversions for a particular small cell 34(1)-34(P). For example, media converter 40(1) may be dedicated to perform media conversions for a particular small cell 34(1), media converter 40(2) dedicated to perform media conversions for small cell 34(2), and so on. The media converters 40(1)-40(Z) are each configured to convert the received small cell communications 28(1)-28(M), received as electrical communications signals, to optical small cell communications 28O(1)-28O(M) to be distributed to respective small cells 34(1)-34(P). Likewise, the media converters 40(1)-40(Z) are also configured to convert received return optical small cell communications 42O(1)-42O(P), as optical communications signals, from respective small cells 34(1)-34(P), to electrical small cell communications 42E(1)-42E(P), received as electrical communications signals, to be distributed back to the small cell service providers 30(1)-30(M). For instance, taking small cell communications 28(1), 28(2) referenced above as an example, a media converter 40 among the media converters 40(1)-40(Z) can convert electrical RRH communication services from small cell service provider 30(5) to optical RRH communication services to be routed to RRH small cell 34(5). A media converter 40 among the media converters 40(1)-40(Z) is also configured to convert return optical communications from the RRH small cell 34(5) to electrical RRH communications to be provided to small cell service provider 30(5).

With continuing reference to FIG. 2, the communications control equipment 26 is also configured to interface with other wired networks. For example, in FIG. 2, the communications control equipment 26 is shown as communicatively interfacing with a wired network 44. Wired network 44 may be another network in the same building or facility in which the unified optical fiber-based DAS 24 is deployed as a non-limiting example. As will be discussed in more detail below, the communications control equipment 26 may have the capability of routing the small cell communications 28(1)-28(M) to the wired network 44 as opposed to or in addition to the small cells 34(1)-34(P). Examples of the wired network 44 could include, but are not limited to, switch-based local area network (LAN), a passive optical LAN (POL), and a passive optical network (PON).

With continuing reference to FIG. 2, the unified optical fiber-based DAS 24 may optionally also be configured to distribute communications other than small cell communications to other devices in this example. For example, the communications control equipment 26 may also be configured to distribute a plurality of non-small cell communications 46(1)-46(R) from a plurality of non-small cell service providers 48(1)-48(R), where R is equal to the number of non-small cell service providers 48. The non-small cell communications 46(1)-46(R) may also be provided from any of the small cell service providers 30(1)-30(M) that are able to provide both small cell and non-small cell communications. A non-small cell communications is a communication for a cell, node, or other communications device that does not include a digital backhaul for wireless communications. For example, the non-small cell service providers 48(1)-48(R) are illustrated in FIG. 2 as being configured to provide non-small cell communications 46(1)-46(R) to non-small cells 52(1)-52(S). The non-small cell communications 46(1)-46(R) could be provided to remote antenna units communicatively coupled to the communications control equipment 26. In this manner, the communications control equipment 26 is provided and configured to be able to distribute communications in a centralized manner for different types of communications services, including small cell and non-small cell communications. Additional communications services not initially supported by the unified optical fiber-based DAS 24 can be later supported by the communications control equipment 26 without having to change cabling or distribution of already supported communications services.

As an example, the communications control equipment 26 may be configured with analog DAS equipment to be able to distribute non-small cell communications 46(1)-46(R) to non-small cells 52(1)-52(S). The non-small cell communications 46(1)-46(R) can also include wired communications services, including without limitation, television services, telephony services, computer communications services, surveillance video services, radio frequency identification device (RFID) reader communications services, and a near field communications (NFC) reader communications services.

With continuing reference to FIG. 2, to facilitate receiving the plurality of non-small cell communications 46(1)-46(R) from the non-small cell service providers 48(1)-48(R), the communications control equipment 26 in the unified optical fiber-based DAS 24 includes a plurality of communications interfaces 50(1)-50(R). The communications interfaces 50(1)-50(R) are configured to receive the respective non-small cell communications 46(1)-46(R) from the respective non-small cell service providers 48(1)-48(R). The communications control equipment 26 is configured to distribute the non-small cell communications 46(1)-46(R) to any of a designated plurality of non-small cell edge devices 52(1)-52(S) (also referred to herein as "non-small cells 52(1)-52(S)), where 'S' is the number of non-small cell edge devices. For example, any of the non-small cells 52(1)-52(S) could include a remote antenna unit configured to distribute non-small cell communications (e.g., cellular communications), if the non-small cell communications 46 to be distributed are non-small cell communications. The communications control equipment 26 also includes a plurality of communications output ports 54(1)-54(S) coupled to the plurality of non-small cells 52(1)-52(S). The communications control equipment 26 is configured to route the non-small cell communications 46(1)-46(R) through designated or configured communications output ports 54(1)-54(S) to be distributed to the non-small cells 52(1)-52(S). The non-small cells 52(1)-52(S) may be provided in remote locations in a building or other facility.

Optical fiber 38 is also used to communicatively couple the non-small cells 52(1)-52(S) to the communications control equipment 26 to facilitate distribution of non-small cell communications 46(1)-46(R) to the non-small cells 52(1)-52(S) and to receive return non-small cell communications from the non-small cells 52(1)-52(S) to be distributed back to the non-small cell service providers 48(1)-48(R). In this embodiment, each non-small cell 52(1)-52(S) in the unified optical fiber-based DAS 24 in FIG. 2 is also communicatively coupled to the communications control equipment 26 through respective dedicated optical fibers 56(1)-56(S). The optical fibers 56(1)-56(S) may be provided individually in cables or bundled together in sets or subsets of the optical fibers 56(1)-56(S) in a common cable to be distributed to connected respective sets or subsets of the non-small cells 52(1)-52(S). For example, a common optical fiber cable containing a plurality of optical fibers 56 may be employed to services non-small cells 52 in the same area.

With continuing reference to FIG. 2, the media converters 40(1)-40(Z) are also configured to support use of the optical fiber 56 for distribution of non-small cell communications 46(1)-46(R) between the communications control equipment 26 and the non-small cells 52(1)-52(S). For example, certain media converters 40(1)-40(Z) may be dedicated to perform media conversions for the-small cells 52(1)-52(S). Certain media converters 40(1)-40(Z) are configured to convert the received non-small cell communications 46(1)-46(R), received as electrical communications signals, to optical non-small cell communications 46O(1)-46O(R) to be distributed to respective non-small cells 52(1)-52(S). Likewise, certain media converters 40(1)-40(Z) are also configured to convert received return optical non-small cell communications 58O(1)-58O(S), as optical communications signals, from certain non-small cells 52(1)-52(S), to electrical non-small cell communications 58E(1)-58E(S), as electrical communications signals, to be distributed back to respective non-small cell service providers 48(1)-48(R).

Figure 3:
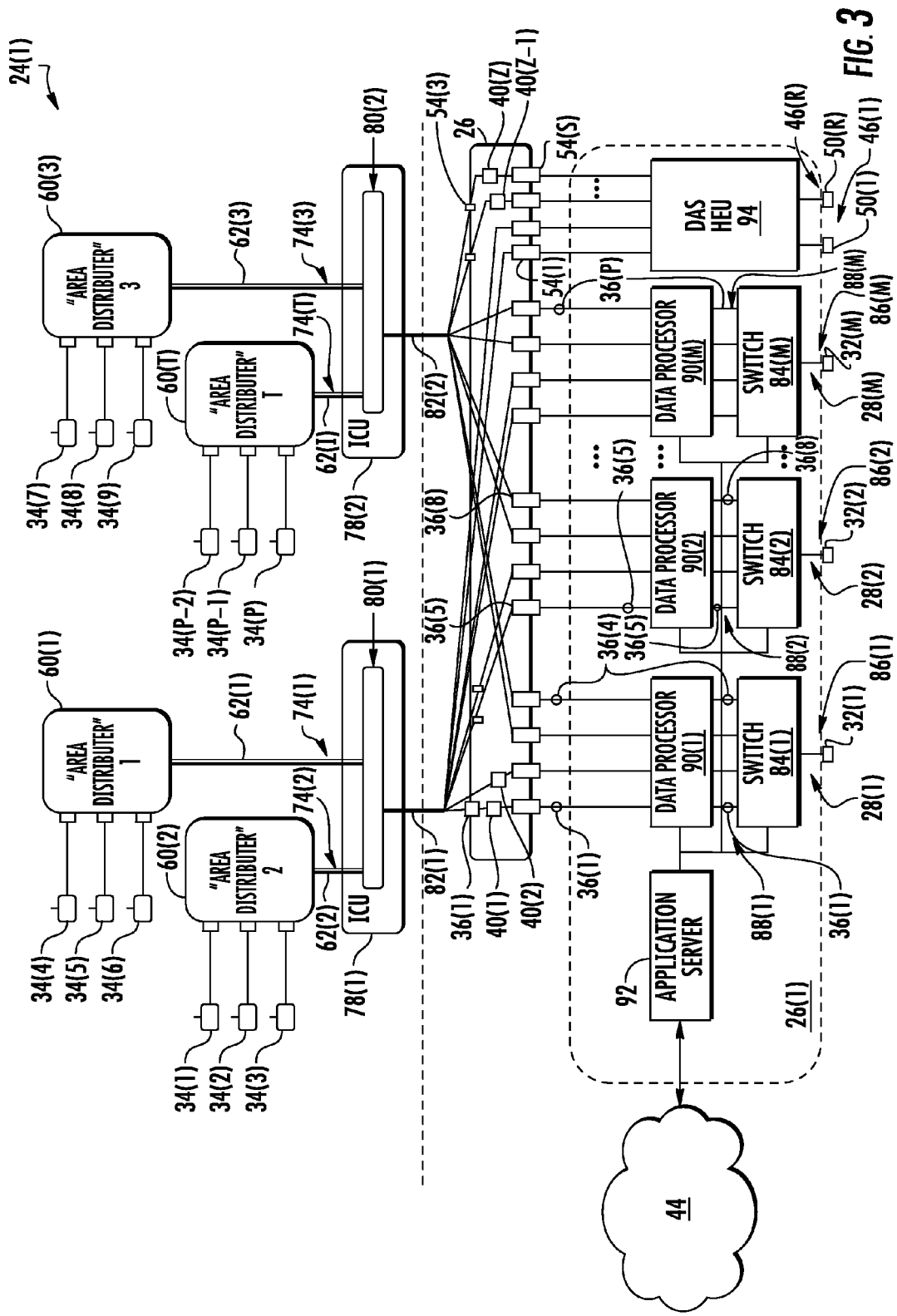
FIG. 3 is a schematic diagram of an exemplary unified optical fiber-based DAS for supporting small cell communications deployment from multiple small cell service providers over separate optical fibers to one or more area distributers each configured to interface multiple small cells to the DAS.

Different variations of the unified optical fiber-based DAS 24 in FIG. 2 can be provided. In this regard, FIG. 3 is a schematic diagram of an exemplary unified optical fiber-based DAS 24(1) for supporting small cell communications deployment from multiple small cell service providers over separate optical fibers similar to the unified optical fiber-based DAS 24 in FIG. 2. Common elements are shown with common element numbers between FIGS. 2 and 3, and thus will not be re-described. As will be discussed in more detail below, the unified optical fiber-based DAS 24(1) in FIG. 3 includes a plurality of area distributers 60(1)-60(T), wherein T is the number of area distributers. The area distributers 60(1)-60(T) are each configured to interface subsets of the small cells 34(1)-34(P) to the communications control equipment 26(1). As a non-limiting example, the area distributers 60(1)-60(T) are each configured to receive a respective multi-fiber cable 62(1)-62(T) each comprised of a plurality of optical fibers 38 to communicatively couple the small cells 34(1)-34(P) to communications control equipment 26(1). The plurality of optical fibers 38 are broken out with the area distributer 60(1)-60(T) from the respective multi-fiber cable 62(1)-62(T) to be connected to a small cell 34(1)-34(P) serviced by the respective area distributer 60(1)-60(T).

Figure 4:
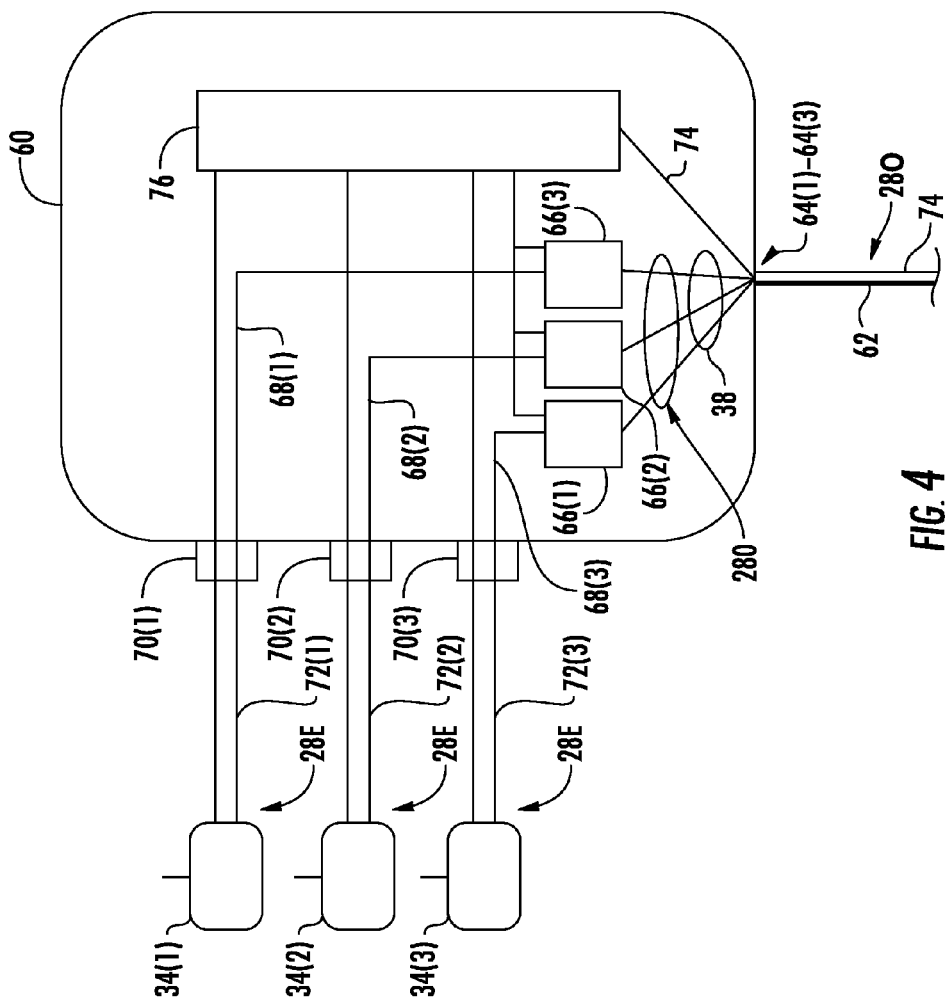
FIG. 4 is a schematic diagram of an exemplary area distributer provided in the unified optical fiber-based DAS in FIG. 3 for interfacing multiple small cells to the DAS.

FIG. 4 is a schematic diagram of an exemplary area distributer 60 that can be provided in the unified optical fiber-based DAS 24(1) in FIG. 3 for interfacing multiple small cells 34(1)-34(P) to the communications control equipment 26(1). As illustrated in FIG. 4, the area distributer 60 receives a multi-fiber cable 62 in this example. The multi-fiber cable 62 is comprised of individual, dedicated optical fibers 38 to provide one or more small cell communications 28 to the small cells 34 connected to the area distributer 60. In this non-limiting example, three (3) small cells 34(1)-34(3) are connected to the area distributer 60 to be coupled one or more communications interfaces 32(1)-

32(M) to receive one or more small cell services 28 routed by the communications control equipment 26(1) (not shown) to the area distributer 60. The area distributer 60 has a plurality of service input ports 64(1)-64(3) configured to receive a small cell communications 28. As an example, the plurality of communications input ports 64(1)-64(3) may be embedded in a single connector. Three (3) local media converters 66(1)-66(3) are included in the area distributer 60 to convert the received optical small cell communications 28O to electrical small cell communications 28E to be provided over electrical conductors 68(1)-68(3), such as copper conductors. The area distributer 60 includes communication service output ports 70(1)-70(3) configured to be connected to the small cells 34(1)-34(3) to couple the electrical conductors 68(1)-68(3) of the area distributer 60 to electrical conductor cables 72(1)-72(3) connecting the small cells 34(1)-34(3) to the communication service output ports 70(1)-70(3). For example, the electrical conductor cables 72(1)-72(3) could be CAT 5, 6, or 7 cables each having multiple electrical conductors capable of carrying communications and power to the small cells 34(1)-34(3).

With continuing reference to FIG. 4, the area distributer 60 is also configured to distribute power to the connected small cells 34(1)-34(3). In this embodiment, the multi-fiber cable 62 also includes one or more electrical conductors 74 configured to provide power to a powering unit 76. In this manner, the small cells 34(1)-34(3), which include power-consuming components, can be powered through connection to the area distributer 60, as opposed to being required to be powered through another source outside of the unified optical fiber-based DAS 24(1). For example, the small cells 34(1)-34(3) may be Power-over-Ethernet (PoE) devices that are configured to receive power from Ethernet ports provided as the communication service output ports 70(1)-70(3). The powering unit 76 may also be capable of providing power management capabilities such as voltage regulation, power measurement, and over current protection, as non-limiting examples.

The small cells 34(1)-34(3) could be powered through another source outside of the unified optical fiber-based DAS 24(1). Further, the small cells 34(1)-34(3) may be configured for reverse powering, whereby power provided to the small cells 34(1)-34(3) through another source outside of the unified optical fiber-based DAS 24(1), could be provided over the respective electrical conductors 74 to be provided to powering unit 76, which could then provide the power to another small cell 34(1)-34(3) supported by the area distributer 60.

With reference back to FIG. 3, power supplied over the one or more electrical conductors (ICUs) 74(1)-74(T) of the area distributers 60(1)-60(T) may be sourced from interconnect units 78(1), 78(2). The ICUs 78(1), 78(2) in this example are configured to route received power 80(1), 80(2) to the electrical conductors 74(1)-74(T) to be provided to the area distributers 60(1)-60(T) to be provided to the respective small cells 34 connected to the area distributers 60(1)-60(T). The ICUs 78(1), 78(2) also serve as a connection point for multi-fiber cables 82(1), 82(2), which each comprise a plurality of the optical fibers 38 configured to carry small-cell communications 28(1)-28(M) to the small cells 34(1)-34(P) and to provide return communications from the small cells 34(1)-34(P) to the small-cell service providers 30(1)-30(M). The optical fibers 38 provided in each multi-fiber cable 82(1), 82(2) can be configured according to the distribution of ICUs 78(1), 78(2) and the distribution of small cells 34(1)-34(P) in the unified optical fiber-based DAS 24(1). The optical fibers 38 provided in each multi-fiber cable 82(1), 82(2) are coupled to dedicated optical ports 36(1)-36(P) and 54(1)-54(S) provided in the communications control equipment 26, as shown in FIG. 2.

With continuing reference to FIG. 3, the communications control equipment 26(1) in the unified optical fiber-based DAS 24(1) also includes a plurality of switches 84(1)-84(M). The switches 84(1)-84(M) are each configured to route the small cells communications 28(1)-28(M) from their respective communications interface 32(1)-32(M) to the desired communications output 36(1)-36(P), which are each connected to a small cell 34 among the plurality of small cells 34(1)-34(P). The switches 84(1)-84(M) may each be configured to an aggregation of small cells communications 28 or a single small cell communications 28. The switches 84(1)-84(M) each have a plurality of respective communications input ports 86(1)-86(M) each configured to be coupled to a respective communications interface 32(1)-32(M) to receive a respective aggregated small cell communications 28(1)-28(M) from a respective small cell service provider 30(1)-30(M) (not shown). Each switch 84(1)-84(M) is configured to separate a received small cell communications 28 into multiple lines 88(1)-88(M) to be able to provide the received small cell communications 28 to multiple small cells 34. Each switch 84(1)-84(M) is also configured to merge small-cell communications from the small cells 34 communicatively coupled to the respective switch 84(1)-84(M) to be provided to the small-cell communications service provider 30(1)-30(M) coupled to the respective switch 84(1)-84(M). In this example, each switch 84(1)-84(M) is configured to separate a received small cell communications 28 or aggregated small cell communications 28 into four (4) communications lines to be provided to up to four small cells 34.

With continuing reference to FIG. 3, a plurality of data processors 90(1)-90(M) are also provided in the communications control equipment 26(1). Each data processor 90(1)-90(M) is associated with a respective switch 84(1)-84(M). The data processors 90(1)-90(M) are each coupled to a respective communications output port 36 associated with their associated switch 84, as illustrated in FIG. 3. Each data processor 90(1)-90(M) is configured to analyze data communicated over the respective communications interfaces 32(1)-32(M). Each data processor 90(1)-90(M) is also configured to insert and/or modify data communicated over the respective communications interfaces 32(1)-32(M) depending on the desired application.

With continuing reference to FIG. 3, each data processor 90(1)-90(M) is also communicatively coupled to an application server 92 provided in the communications control equipment 26(1) in this example. In this manner, the application server 92 can provide centralized services for the unified optical fiber-based DAS 24(1). For example, if the application server 92 desires to analyze data communicated over the respective communications interfaces 32(1)-32(M), the application server 92 can instruct the data processors 90(1)-90(M) to provide copies of the communicated data to the application server 92 to be analyzed. If the application server 92 desires to insert and/or modify data communicated over the respective communications interfaces 32(1)-32(M) depending on the desired application, the application server 92 can provide the inserted and/or modified data to the desired data processor 90(1)-90(M) to be inserted and/or modified in the respective small cell communications 28(1)-28(M) associated with the data processor 90(1)-90(M). For example, the application server 92 may be also be configured to read an interference level indication provided in the small cell communications 28(1)-28(M) communicated over the respective communications interfaces 32(1)-32(M) to be able to instruct other small cells 34 among small cells 34(1)-34(P) to reduce power. The application server 92 may also be configured to provide the small cell communications 28(1)-28(M) to the wired network 44, if desired. A single application server 92 may be provided to provide application services for all data processors 90(1)-90(M). Alternatively, more than one application server 92 may be provided, such as a dedicated application server 92 for each data processor 90(1)-90(M) as one non-limiting example.

With continuing reference to FIG. 3, as previously discussed above with regard to the unified optical fiber-based DAS 24 in FIG. 2, the communications control equipment 26(1) may also be configured to support non-small cell communications. In this regard, the communications control equipment 26(1) may also include a cellular communications service head end unit (HEU) 94. The HEU 94 is configured to distribute the non-small cell communications 46(1)-46(R) to remote antenna units or other cellular devices that may be coupled to an area distributer 60(1)-60(T) in place of a small cell 34 illustrated in FIG. 3. More information of an exemplary DAS that includes a HEU that may be employed as the HEU 94 in FIG. 3 is described in U.S. Patent Application Publication No. 2011/0268446 entitled "Providing Digital Data Services in Optical Fiber-based Distributed Radio Frequency (RF) Communications Systems, And Related Components and Methods," which is incorporated herein by reference in its entirety.

Figure 5A:
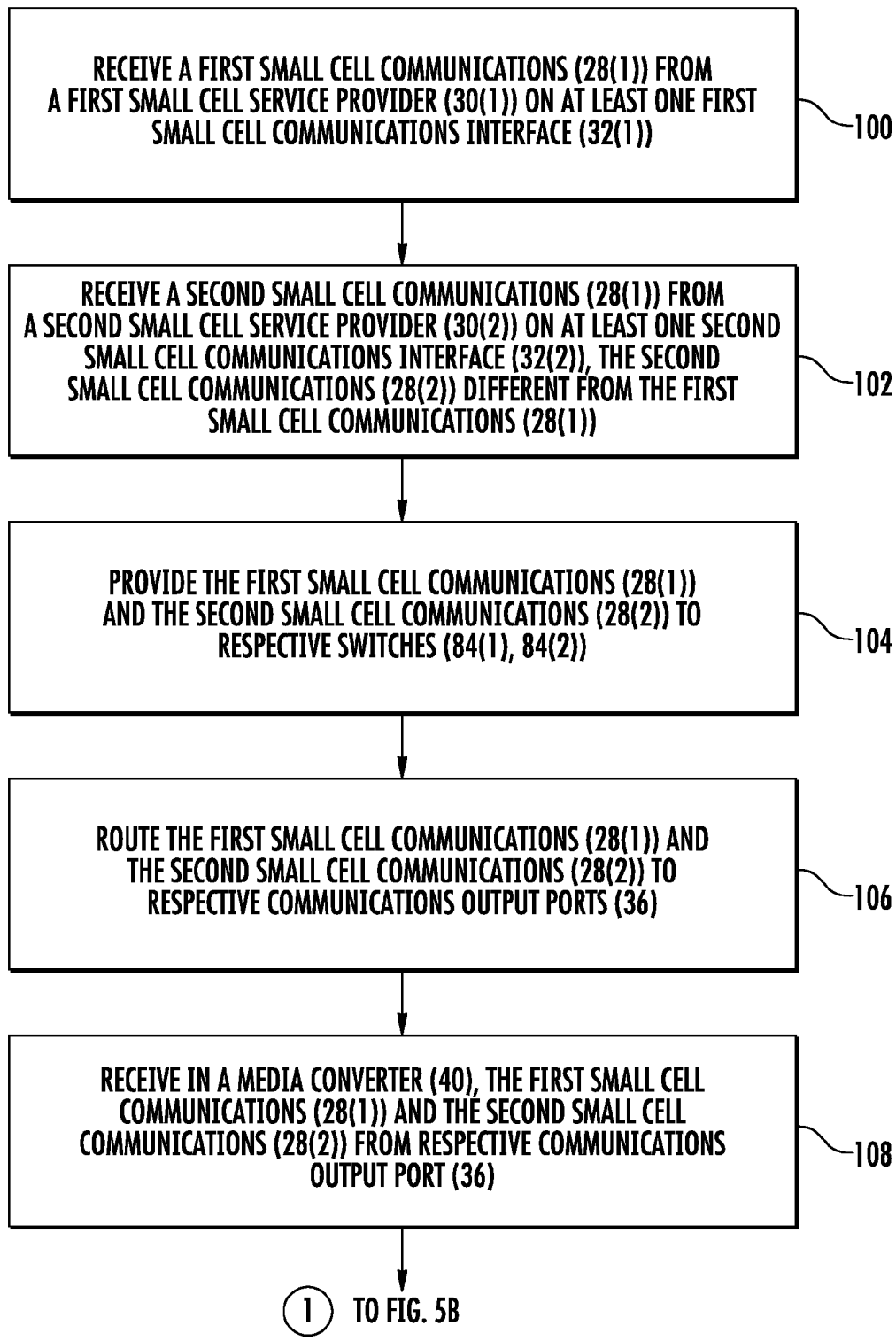
FIGS. 5A and 5B are a flowchart illustrating an exemplary process for distributing different small cell communications from multiple small cell service providers over separate optical fibers in the unified optical fiber-based DAS in FIG. 3.
Figure 5B:
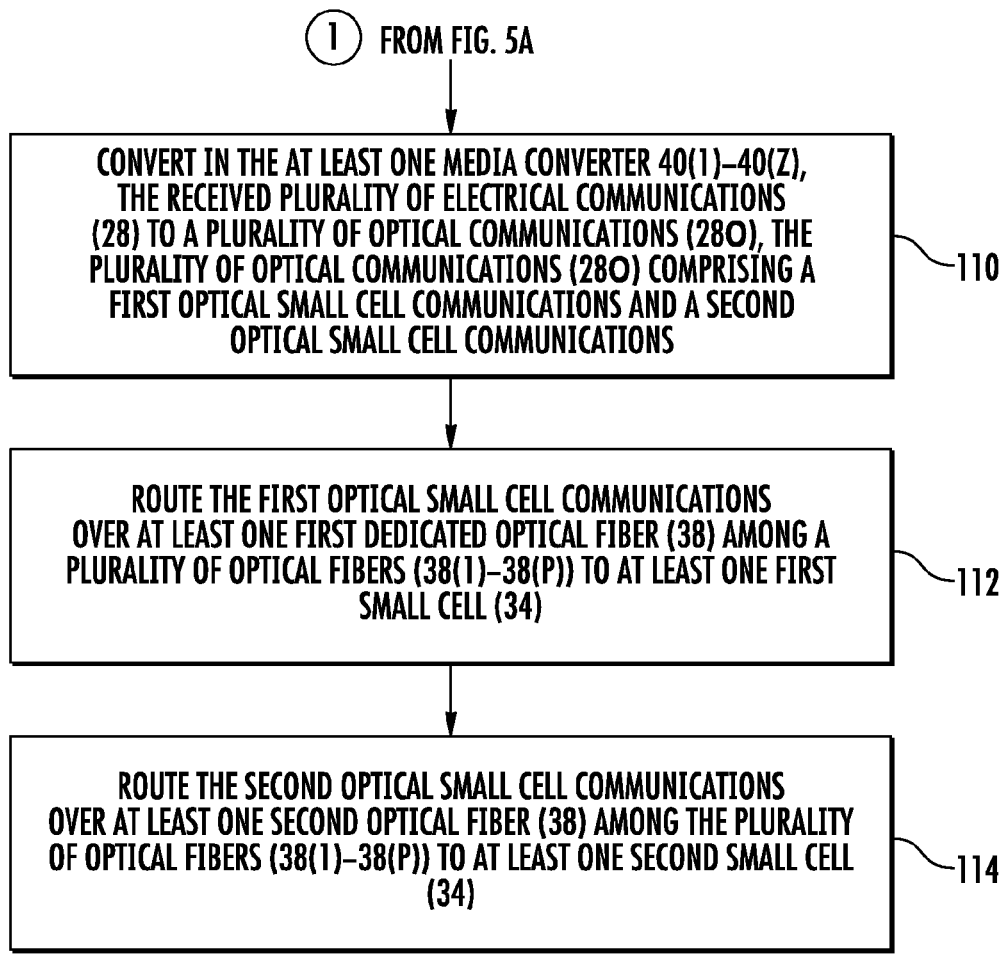

The unified optical fiber-based DAS 24(1) in FIG. 3 is capable of distributing different small cell communications 28 from different small cell service providers 30 to small cells 34. In this regard, FIGS. 5A and 5B provide a flowchart illustrating an exemplary process for distributing different small cell communications 28 from multiple small cell service providers 30 over separate optical fibers 38 in the unified optical fiber-based DAS 24(1) in FIG. 3. In this regard, the communications control equipment 26 is configured to receive a first small cell communications 28(1) from a first small cell service provider 30(1) on at least one first small cell communications interface 32(1) (block 100 in FIG. 5A). The communications control equipment 26 is also configured to receive a second small cell communications 28(2) from a second small cell service provider 30(2) on at least one second small cell communications interface 32(2) (block 102 in FIG. 5A). The second small cell communications 28(2) is different from the first small cell communications 28(1). The communications control equipment 26 is configured to provide the first small cell communications 28(1) and the second small cell communications 28(2) to respective switches 84(1), 84(2) (block 104 in FIG. 5A). The switches 84(1), 84(2) are configured to route the first small cell communications 28(1) and the second small cell communications 28(2) to respective communications output ports 36 (block 106 in FIG. 5A). The media converter 40(1) receives the first small cell communications 28(1). Another media converter 40(2) receives the second small cell communications 28(2) from the respective communications output port 36 (block 108 in FIG. 5A).

The media converters 40(1), 40(2) each convert the received plurality of electrical small cell communications 28E to a plurality of optical small cell communications 28O, the plurality of optical small cell communications 28O comprising a first optical small cell communications 28O(1) and a second optical small cell communications 28O(2) (block 110 in FIG. 5B). The first optical small cell communications 28O(1) is routed over at least one first dedicated optical fiber 38 among a plurality of optical fibers 38(1)-38 (P) to at least one first small cell 34(1) (block 112 in FIG. 5B). The second optical small cell communications 28O(2) is routed over at least one second dedicated optical fiber 38(2) among the plurality of optical fibers 38(1)-38(P) to at least one second small cell 34(2) (block 114 in FIG. 5B).

Figure 6:
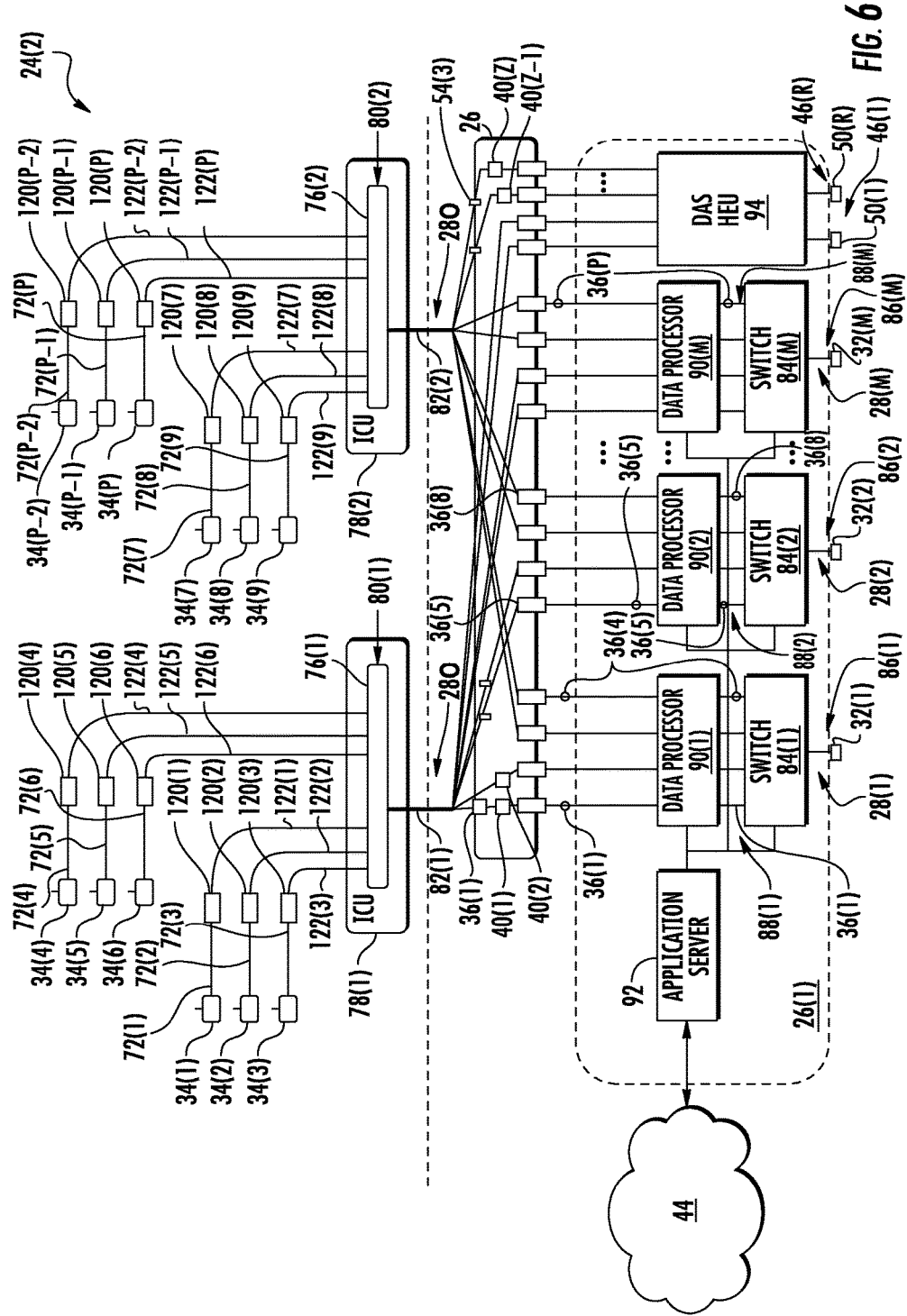
FIG. 6 is a schematic diagram of another exemplary unified optical fiber-based DAS for supporting small cell communications deployment from multiple small cell service providers over separate optical fibers directly to the small cells via edge device interfaces.

FIG. 6 is a schematic diagram of another exemplary unified optical fiber-based DAS 24(2) for supporting small cell communications deployment from multiple small cell service providers over separate optical fibers directly to the small cells via edge device interfaces. The unified optical fiber-based DAS 24(2) is similar to the unified optical fiber-based DAS 24(1) in FIG. 3. Common components are indicated by common element numbers between the unified optical fiber-based DAS 24(2) in FIG. 6 and the unified optical fiber-based DAS 24(1) in FIG. 3, and thus will not be re-described. However, in the unified optical fiber-based DAS 24(2) in FIG. 6, the multi-fiber cables 82(1), 82(2) are routed through the ICUs 78(1), 78(2) to edge device interfaces 120(1)-120(P) directly to each small cell 34(1)-34(P). The edge device interfaces 120(1)-120(P) enable separation of the composite cables 122(1)-122(P), each comprising an optical fiber 38 for communications and an electrical conductor 74 for carrying power. The edge device interfaces 120(1)-120(P) in this embodiment are each only configured to support one small cell 34(1)-34(P), unlike the area distributers 60 illustrated in FIG. 3, which are configured to support multiple small cells 34.

Figure 7A:
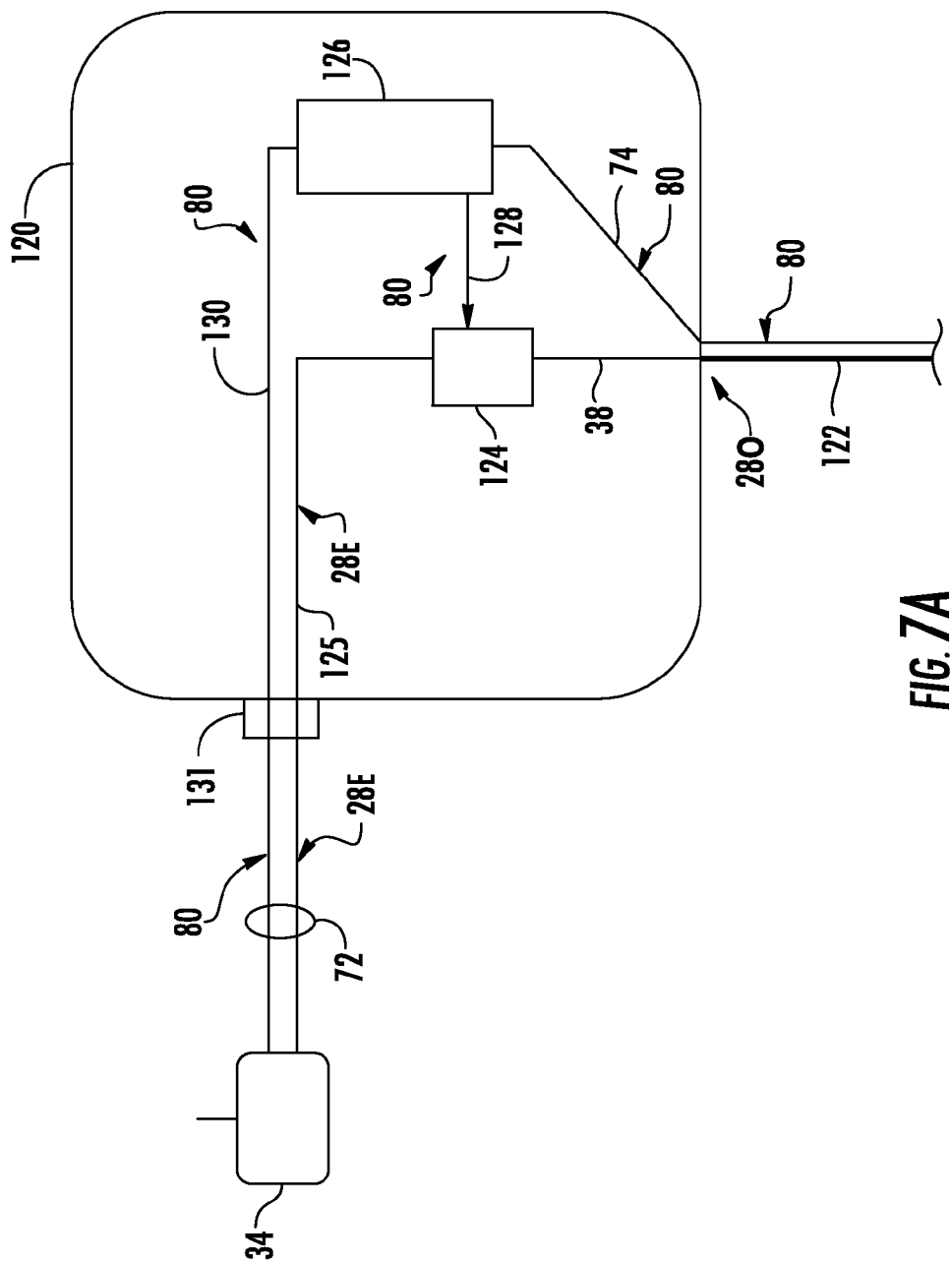
FIG. 7A is a schematic diagram of an exemplary edge device interface interfacing a small cell to a small cell communications in the unified optical fiber-based DAS in FIG. 6.
Figure 7B:
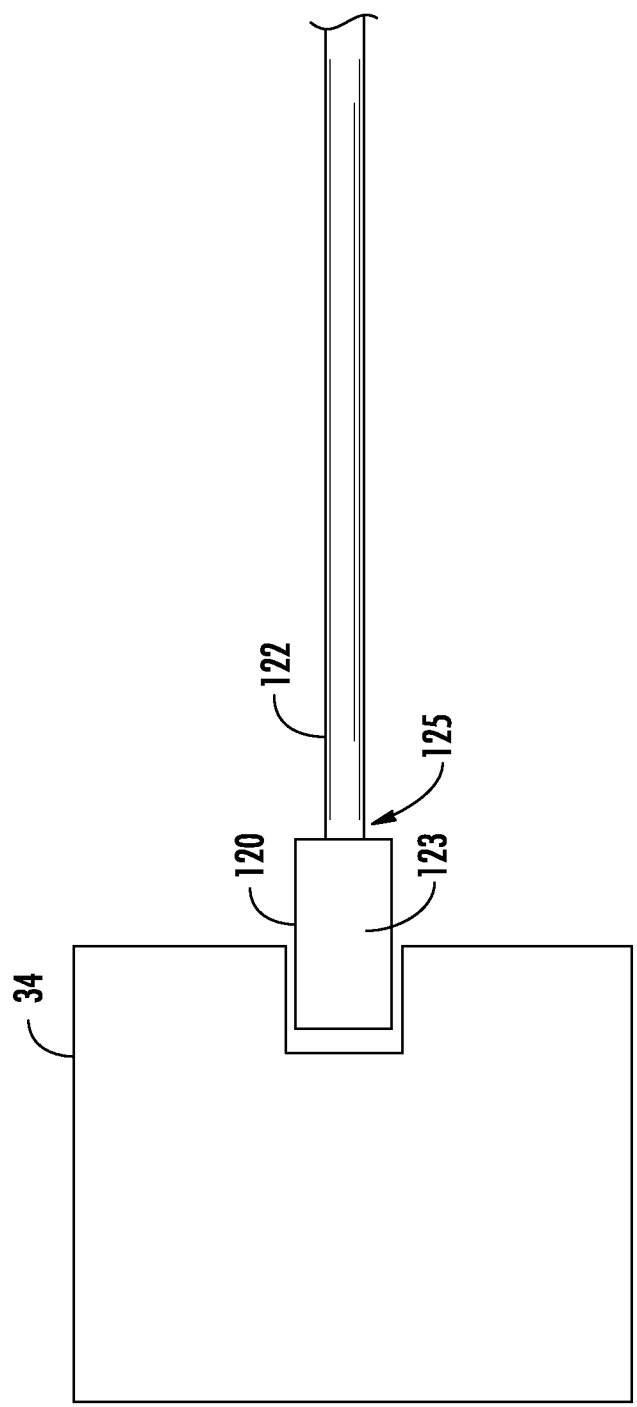
FIG. 7B is a schematic diagram of the exemplary edge device interface in FIG. 7A interfacing a small cell to a small cell communications in the DAS in FIG. 6.

In this regard, FIG. 7A is a schematic diagram of an exemplary edge device interface 120 interfacing a small cell 34 to a small cell communications 28 in the unified optical fiber-based DAS 24(2) in FIG. 6. FIG. 7B is a schematic diagram of the exemplary edge device interface 120 in FIG. 7A interfacing the small cell 34 to a small cell communications 28 in the unified optical fiber-based DAS 24(2) in FIG. 6. With reference to FIG. 7A, a composite cable 122 is shown extending to the edge device interface 120. The composite cable 122 is comprised of one or more optical fibers 38 for communication services and an electrical conductor 74 for carrying power for providing power to the small cell 34 connected to the edge device interface 120. The optical fibers 38 are provided to a local media converter 124 that is configured to convert the optical small cell communications 28O to an electrical small cell communications 28E over electrical communications line 125 as previously described. The local media converter 124 is also configured to convert return electrical small cell communications from the small cell 34 to optical small cell communications to be provided to the communications control equipment 26(1). The electrical conductor 74 is provided to a powering unit 126 that is configured to direct power 80 to the local media converter 124 over power line 128 for operation. The powering unit 126 is also configured to provide power 80 over power line 130 to a communications output port 132. The communications output port 131 is configured to couple the electrical communications line 125 and the power line 130 to an electrical conductor cable 72 connected to the small cell 34. For example, the electrical conductor cable 72 could be a CAT 5, 6, or 7 cable. The powering unit 126 may also be capable of providing power management capabilities such as voltage regulation, power measurement, and over current protection, as non-limiting examples.

With reference to FIG. 7B, the edge device interface 120 may be implemented inside a connector enclosure 123, which is mounted on the end portion 125 of the composite cable 122. This exemplary implementation of the edge device interface 120 may eliminate the need for the electrical cable 72, since the edge device interface 120 is embedded in the connector 120 connected directly to a small cell 34.

Figure 8A:
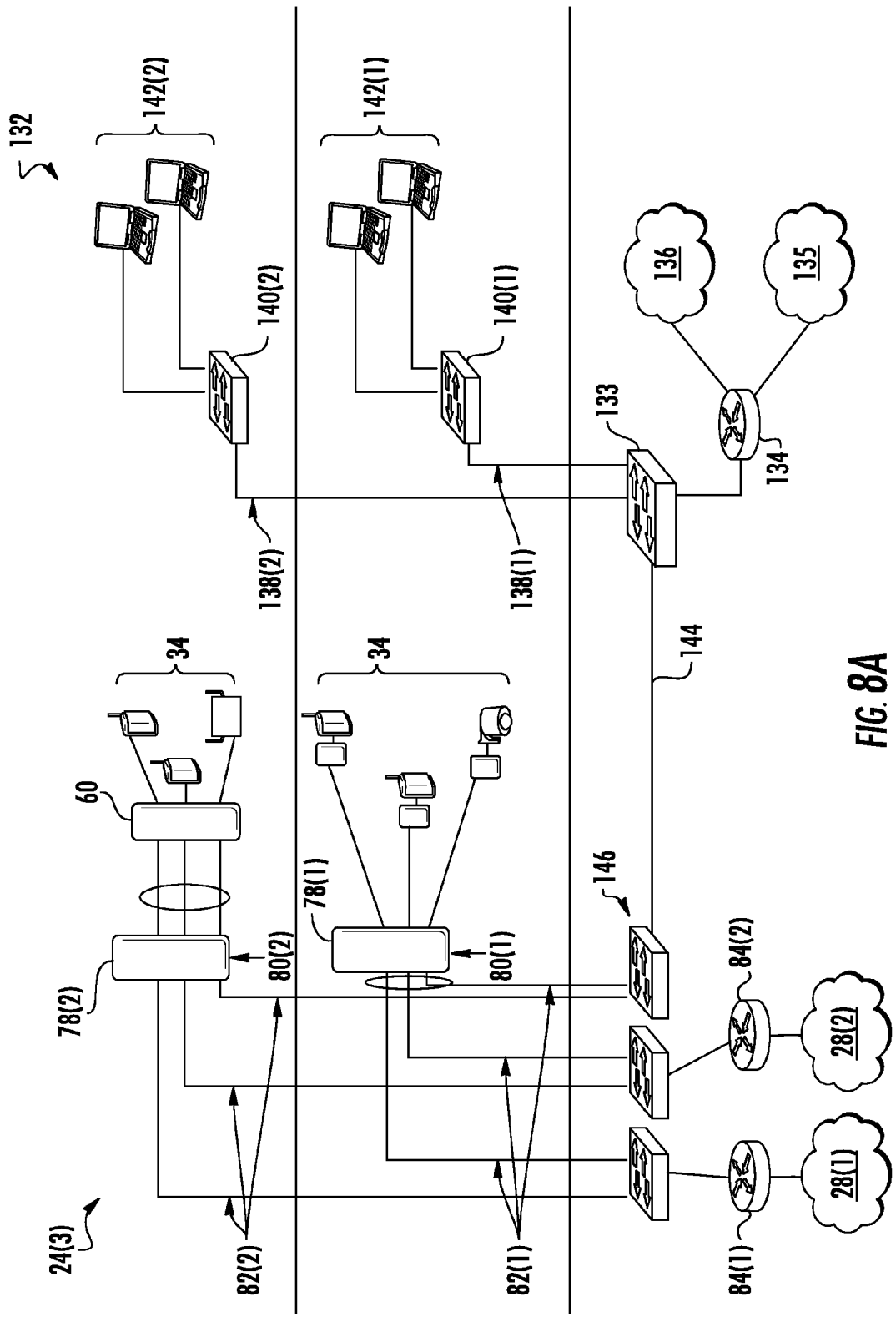
FIG. 8A is a schematic diagram illustrating concurrent use of a network for a unified optical fiber-based DAS for supporting small cell communications deployment from multiple small cell service providers over separate optical fibers and a traditional switch-based local area network (LAN)

The unified optical fiber-based DAS disclosed herein may be employed to distribute communications received from other networks and also to provide data received from the small cells 34(1)-34(P) to other networks). For example, FIG. 8A is a schematic diagram illustrating concurrent use of a network for a unified optical fiber-based DAS 24(3) for supporting small cell communications deployment from multiple small cell service providers over separate optical fibers and a traditional switch-based local area network (LAN) 132. A core switch 133 is provided that can provide switched communication services between the unified optical fiber-based DAS 24(3) and the traditional switch-based LAN 132. The core switch 133 is configured to provide communication services from a router 134 that is coupled to an enterprise network 135 and the Internet 136 as examples. The core switch 133 may provide switch communications to optical fibers 138(1), 138(2) to work group switches 140(1), 140(2), respectively, to provide the communications to end user terminals 142(1), 142(2), respectively. The core switch 133 is also configured to provide communication services from the router 134 over an optical fiber cable 144 to enterprise switches 146 in the unified optical fiber-based DAS 24(3).

Figure 8B:
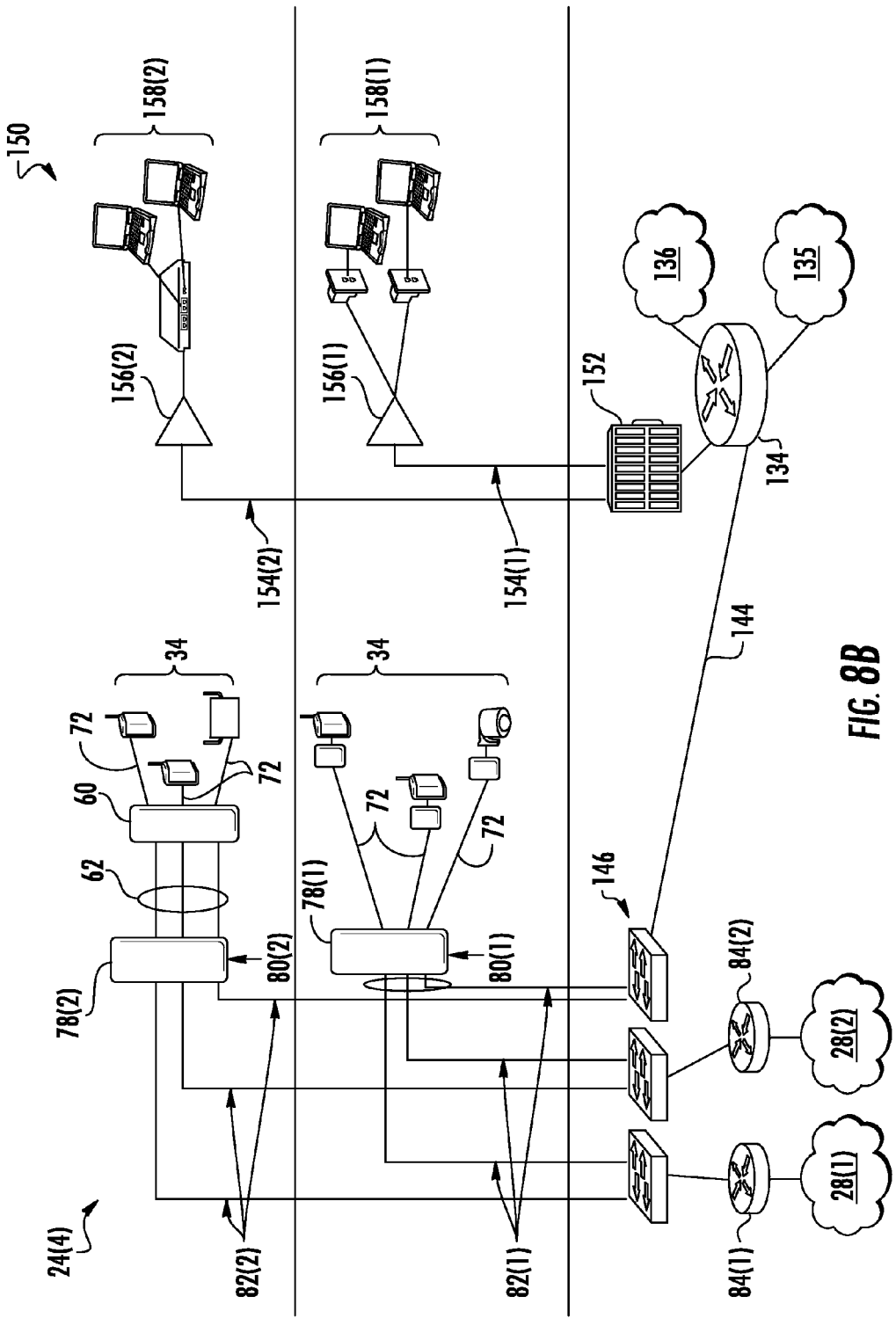
FIG. 8B is a schematic diagram illustrating concurrent use of a network for a unified optical fiber-based DAS for supporting small cell communications deployment from multiple small cell service providers over separate optical fibers and a passive optical network (PON)

FIG. 8B is a schematic diagram illustrating concurrent use of a network for a unified optical fiber-based DAS 24(4) for supporting small cell communications deployment from multiple small cell service providers over separate optical fibers and a passive optical network (PON) 150. An optical line terminal (OLT) 152 is provided that can provide communication services between the unified optical fiber-based DAS 24(4) and the PON 150. The OLT 152 is configured to provide communication services from the router 134 that is coupled to the enterprise network 135 and the Internet 136 as examples. The core switch 133 may provide switch communications to optical fibers 154(1), 154(2) to optical splitters 156(1), 156(2), respectively, to provide the communications to optical network terminals (ONTs) 158(1), 158(2), respectively. The OLT 152 is also configured to provide communication services from the router 134 over the optical fiber cable 144 to enterprise switches 146 in the unified optical fiber-based DAS 24(4).

Figure 9:
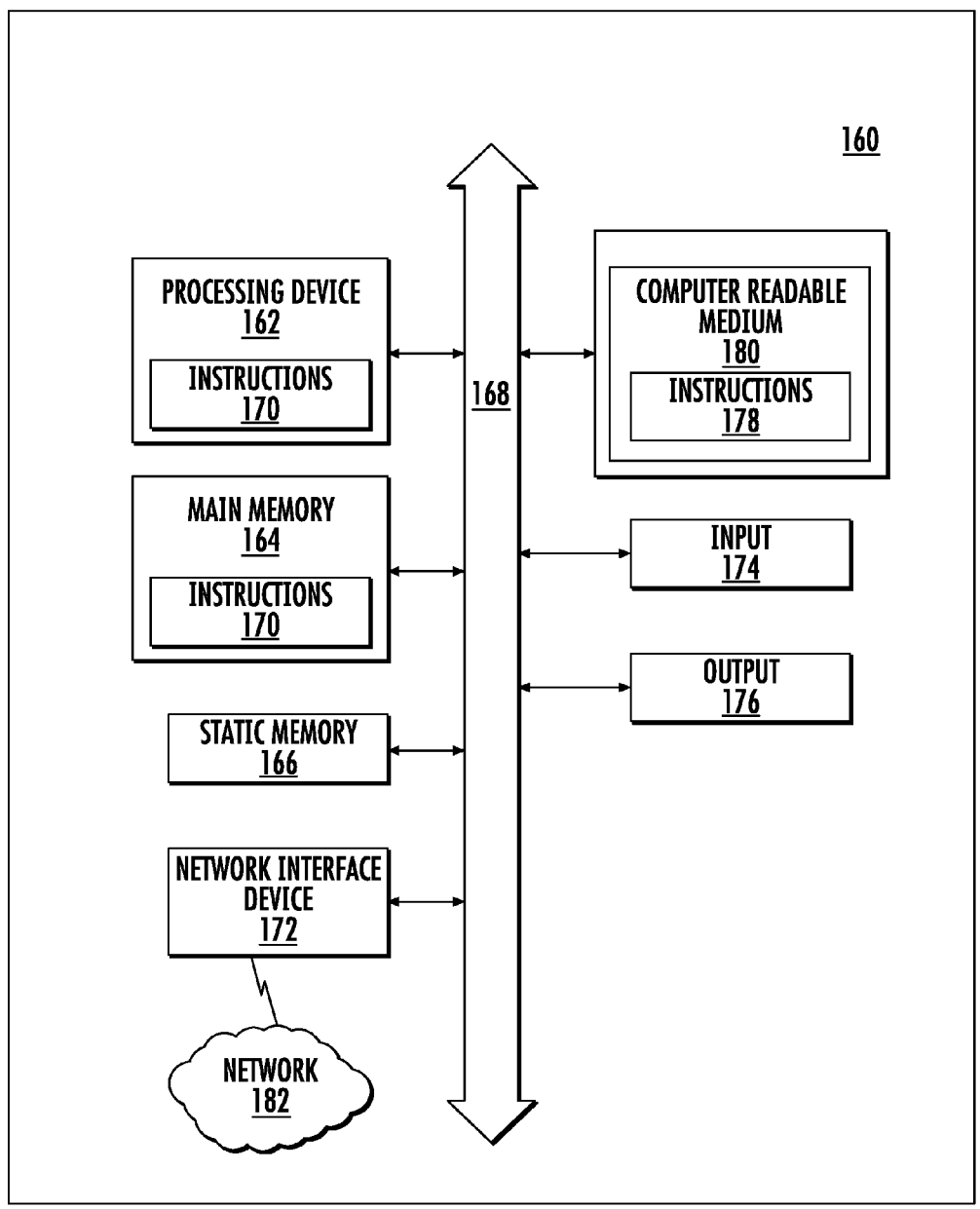
FIG. 9 is a schematic diagram of a generalized representation of an exemplary controller that can be included in any communications control equipment, application server, data processor, media converter, area distributor, small cell, and/ or any other components of the distributed antenna systems disclosed herein.

FIG. 9 is a schematic diagram representation of additional detail illustrating components that could be employed in any of the components or devices disclosed herein or in the optical fiber-based DASs described herein, if adapted to execute instructions from an exemplary computer-readable medium to perform any of the functions or processing described herein. In this regard, such component or device may include a computer system 160 within which a set of instructions for performing any one or more of the location services discussed herein may be executed. The computer system 160 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 160 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 160 in this embodiment includes a processing device or processor 162, a main memory 164 (e.g., read-only memory (ROM), flash memory, dynamic random access memory (DRAM), such as synchronous DRAM (SDRAM), etc.), and a static memory 166 (e.g., flash memory, static random access memory (SRAM), etc.), which may communicate with each other via a data bus 168. Alternatively, the processing device 162 may be connected to the main memory 164 and/or static memory 166 directly or via some other connectivity means. The processing device 162 may be a controller, and the main memory 164 or static memory 166 may be any type of memory.

The processing device 162 represents one or more general-purpose processing devices, such as a microprocessor, central processing unit, or the like. More particularly, the processing device 162 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 162 is configured to execute processing logic in instructions 170 for performing the operations and steps discussed herein.

The computer system 160 may further include a network interface device 172. The computer system 160 also may or may not include an input 174, configured to receive input and selections to be communicated to the computer system 160 when executing instructions. The computer system 160 also may or may not include an output 176, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 160 may or may not include a data storage device that includes instructions 178 stored in a computer-readable medium 180. The instructions 178 may also reside, completely or at least partially, within the main memory 164 and/or within the processing device 162 during execution thereof by the computer system 160, the main memory 164 and the processing device 162 also constituting computer-readable medium. The instructions 178 may further be transmitted or received over a network 182 via the network interface device 172.

While the computer-readable medium 180 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.)); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Further and as used herein, it is intended that terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, jackets, or the like.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber-based distributed antenna system (DAS) for supporting small cell communications from different small cell service providers, comprising:
    a plurality of edge devices each configured to receive electrical communications from a network, the plurality of edge devices comprising:
        at least one first small cell configured to receive a first electrical small cell communications; and
        at least one second small cell configured to receive a second electrical small cell communications different from the first electrical small cell communications;
    a communications control equipment, comprising:
        a plurality of communications interfaces each configured to receive electrical communications, the plurality of communications interfaces comprising:
            at least one first small cell communications interface configured to receive a first small cell communications from a first small cell service provider; and
            at least one second small cell communications interface configured to receive a second small cell communications from a second small cell service provider; and
        a plurality of switches comprising a plurality of communications output ports and a plurality of communications input ports, the plurality of communications input ports each configured to be coupled to a communications interface among the plurality of communications interfaces;
        wherein each of the plurality of switches is configured to route an electrical communications among a plurality of electrical communications, received on a communications input port among the plurality of communications input ports, to at least two communications output ports among the plurality of communications output ports; and
    a plurality of media converters, comprising:
        a first media converter configured to:
            receive a first electrical communications from at least one communications output port of the plurality of switches;
            convert the received first electrical communications to a first optical communications comprising a first optical small cell communications; and
            route the first optical small cell communications over at least one first dedicated optical fiber among a plurality of optical fibers to the at least one first small cell; and
        a second media converter configured to:
            receive a second electrical communications from at least one communications output port of the plurality of switches;
            convert the received second electrical communications to a second optical communications comprising a second optical small cell communications; and
            route the second optical small cell communications over at least one second dedicated optical fiber among the plurality of optical fibers to the at least one second small cell.

2. The optical fiber-based DAS of claim 1, wherein the communications control equipment further comprises at least one data processor coupled to at least one switch among the plurality of switches, the at least one data processor configured to monitor data communications of the electrical communications routed by the at least one switch.

3. The optical fiber-based DAS of claim 2, wherein the at least one data processor is further configured to insert data in the electrical communications routed by the at least one switch.

4. The optical fiber-based DAS of claim 2, further comprising at least one application server communicatively coupled to the at least one data processor.

5. The optical fiber-based DAS of claim 4, wherein the at least one application server is configured to communicate with the at least one data processor to monitor data in the electrical communications routed by the at least one switch coupled to the at least one data processor.

6. The optical fiber-based DAS of claim 5, wherein the at least one application server is further configured to communicate to the at least one data processor to cause the electrical communications routed by the at least one switch coupled to the at least one data processor to be synchronized.

7. The optical fiber-based DAS of claim 4, wherein the at least one application server is configured to communicate a data insertion message to the at least one data processor to insert data in the electrical communications routed by the at least one switch coupled to the at least one data processor.

8. The optical fiber-based DAS of claim 4, wherein the at least one application server is configured to:
    receive from the at least one data processor, the electrical communications routed by the at least one switch coupled to the at least one data processor; and
    communicate the received electrical communications to at least one other wired network.

9. The optical fiber-based DAS of claim 8, wherein the at least one other wired network is comprised of a network comprised from the group consisting of a switch-based local area network (LAN), a passive optical LAN (POL), and a passive optical network (PON).

10. The optical fiber-based DAS of claim 1, wherein at least one of the plurality of edge devices further comprises an edge device interface comprising:
    a communications input port configured to receive optical communications from a media converter among the plurality of media converters for the at least one of the plurality of edge devices;
    at least one local media converter configured to convert the received optical communications to electrical communications; and
    a communications output port configured to provide the received electrical communications to the at least one of the plurality of edge devices.

11. The optical fiber-based DAS of claim 1, wherein at least one of the at least one first dedicated optical fiber and the at least one second dedicated optical fiber is disposed in a multi-fiber cable.

12. The optical fiber-based DAS of claim 11, wherein the multi-fiber cable comprises at least one electrical conductor configured to carry power to at least one of the at least one first small cell and the at least one second small cell.

13. The optical fiber-based DAS of claim 1, wherein the at least one first dedicated optical fiber and the at least one second dedicated optical fiber are disposed in a same multi-fiber cable.

14. The optical fiber-based DAS of claim 1, wherein:
    the at least one first small cell is comprised of a small cell comprised from the group consisting of a cellular service small cell, a Wireless Fidelity (WiFi) access point, an extremely high frequency (EFH) radio device, a digital DAS cell, a remote radio head (RRH), a location radio node, a wireless reader, and an application-specific radio node; and the at least one second small cell is comprised of a small cell different from the at least one first small cell, the at least one second small cell comprised from the group consisting of a cellular service small cell, a WiFi access point, an EFH radio device, a digital DAS cell, a RRH, a location radio node, a wireless reader, and an application-specific radio node.

15. The optical fiber-based DAS of claim 1, wherein:
at least one of the plurality of media converters is further configured to:
  receive an optical communication from an edge device among the plurality of edge devices destined for another edge device among the plurality of edge devices;
  convert the received optical communication from the edge device to an electrical communication; and
  route the electrical communication to a switch among the plurality of switches associated with the another edge device; and
each of the plurality of switches are further configured to:
  receive the electrical communication destined for the another edge device from the at least one of the plurality of media converters; and
  route the received electrical communication to a communications output port among the plurality of communications output ports coupled to the another edge device.

16. A method of distributing small cell communications from different small cell service providers in an optical fiber-based distributed antenna system (DAS), comprising:
receiving a plurality of electrical communications over a plurality of communications interfaces from a plurality of communications service providers, comprising:
  receiving a first small cell communications from a first small cell service provider on at least one first small cell communications interface; and
  receiving a second small cell communications from a second small cell service provider on at least one second small cell communications interface, the second small cell communications different from the first small cell communications;
providing each of the plurality of electrical communications to at least one communications port in at least one switch among a plurality of switches, each switch among the plurality of switches coupled to at least one communications interface among the plurality of communications interfaces;
routing each of the plurality of electrical communications received on a plurality of communications input ports to at least two communications output ports among a plurality of communications output ports in the plurality of switches;
receiving in a plurality of media converters, the plurality of electrical communications from the plurality of communications output ports of the plurality of switches;
converting in the plurality of media converters, the received plurality of electrical communications to a plurality of optical communications, the plurality of optical communications comprising a first optical small cell communications and a second optical small cell communications;
routing the first optical small cell communications over at least one first dedicated optical fiber among a plurality of optical fibers to at least one first small cell; and
routing the second optical small cell communications over at least one second dedicated optical fiber among the plurality of optical fibers to at least one second small cell.

17. The method of claim 16, further comprising monitoring data communications of the plurality of electrical communications routed by the at least one switch in at least one data processor coupled to the at least one switch among the plurality of switches.

18. The method of claim 17, further comprising the at least one data processor inserting data in the plurality of electrical communications routed by the at least one switch coupled to the at least one data processor.

19. The method of claim 17, further comprising at least one application server configured to communicate a data insertion message to the at least one data processor to insert data in the plurality of electrical communications routed by the at least one switch coupled to the at least one data processor.

20. The method of claim 17, further comprising:
receiving from the at least one data processor, at least one electrical communications among the plurality of electrical communications routed by the at least one switch; and
communicating the received at least one electrical communications to at least one other wired network.

21. The method of claim 20, further comprising:
receiving the plurality of optical communications from the plurality of media converters on the plurality of communications input ports in an area distributer communicatively coupled to a subset of edge devices among a plurality of edge devices;
converting the received plurality of optical communications to a plurality of electrical communications in at least one local media converter in the area distributer;
providing the received plurality of electrical communications to the plurality of communications output ports coupled to the subset of edge devices; and
providing power from a powering unit in the area distributer over the plurality of communications output ports to the subset of edge devices to supply power to the subset of edge devices.

22. The method of claim 17, wherein at least one of a plurality of edge devices comprises an edge device interface, the method comprising:
receiving an optical service from a media converter of the plurality of media converters over a communications input port among the plurality of communications input ports of an edge device;
converting, in a local media converter, the received plurality of optical communications to a plurality of received electrical communications; and
providing the plurality of received electrical communications to a communications output port among the plurality of communications output ports of the edge device.

23. A unified optical fiber-based distributed antenna system (DAS) for supporting small cell communications from different small cell service providers, comprising:
a plurality of edge devices each configured to receive electrical communications from a network, the plurality of edge devices comprising:
  at least one first small cell configured to receive a first electrical small cell communications; and at least one second small cell configured to receive a second electrical small cell communications different from the first electrical small cell communications; and a communications control equipment, comprising:
  a plurality of communications interfaces each configured to receive electrical communications, the plurality of communications interfaces comprising:
    at least one first small cell communications interface configured to receive a first small cell communications from a first small cell service provider; and
    at least one second small cell communications interface configured to receive a second small cell communications from a second small cell service provider;
  a plurality of switches comprising a plurality of communications output ports and a plurality of communications input ports, the plurality of communications input ports each configured to be coupled to a respective communications interface among the plurality of communications interfaces, and wherein:
    the plurality of switches comprises a plurality of small cell communications switches;
    each of the at least one first small cell communications interface and the at least one second small cell communications interface is coupled to a dedicated small cell communications switch for each small cell communications; and
    each dedicated small cell communications switch is configured to receive and route the received small cell communications to at least one of the at least one first small cell and the at least one second small cell; and
  a plurality of media converters, comprising:
    a first media converter configured to:
      receive a first electrical communications from at least one communications output port of the plurality of switches;
      convert the received first electrical communications to a first optical communications comprising a first optical small cell communications; and
      route the first optical small cell communications over at least one first dedicated optical fiber among a plurality of optical fibers to the at least one first small cell; and
    a second media converter configured to:
      receive a second electrical communications from at least one communications output port of the plurality of switches;
      convert the received second electrical communications to a second optical communications comprising a second optical small cell communications; and
      route the second optical small cell communications over at least one second dedicated optical fiber among the plurality of optical fibers to the at least one second small cell.

24. The unified optical fiber-based DAS of claim 23, wherein:
  the plurality of edge devices further comprises:
    at least one non-small cell edge device configured to receive a non-small cell optical communications service;
  the plurality of communications services interfaces further comprises:
    at least one non-small cell communications services interface configured to receive at least one non-small cell communications service from at least one non-small cell service provider;
  the plurality of switches further comprises a plurality of non-small cell communications switches configured to receive and route the at least one received non-small cell communications service; and
  a media converter among the plurality of media converters configured to:
    convert the received at least one non-small cell communications service to at least one non-small cell optical communications service;
    route the at least one non-small cell optical communications service over at least one dedicated optical fiber among the plurality of optical fibers to the at least one non-small cell edge device.

* * * * *

UNITED STATES PATENT AND TRADEMARK OFFICE
CERTIFICATE OF CORRECTION

PATENT NO. : 10,200,124 B2
APPLICATION NO. : 15/790626
DATED : February 5, 2019
INVENTOR(S) : Berlin et al.

Page 1 of 1

It is certified that error appears in the above-identified patent and that said Letters Patent is hereby corrected as shown below:

In the Claims

In Column 20, Line 64, Claim 14, delete "(EFH)" and insert -- (EHF) --, therefor.

In Column 21, Line 5, Claim 14, delete "EFH" and insert -- EHF --, therefor.

Signed and Sealed this
Twenty-eighth Day of January, 2020

Andrei Iancu
*Director of the United States Patent and Trademark Office*